Figure 1:
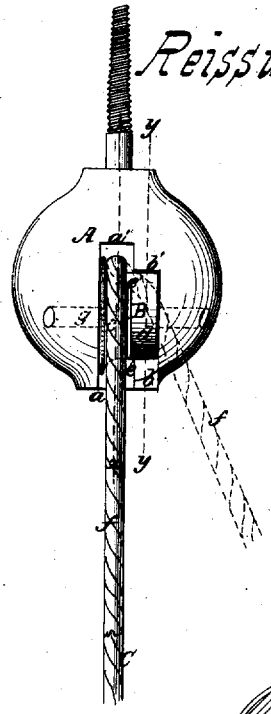

I. E. Palmer,

Tackle Block.

No. 1,932. Reissued Apr. 11, 1865.

Witnesses.

Geo. H. Douglas

M. A. Livingston

Inventor.

Isaac E. Palmer

N. PETERS, PHOTO-LITHOGRAPHER, WASHINGTON, D. C.

UNITED STATES PATENT OFFICE.

ISAAC E. PALMER, OF MIDDLETOWN, CONNECTICUT.

IMPROVEMENT IN TACKLE-BLOCKS.

Specification forming part of Letters Patent No. 25,978, dated November 1, 1859; Reissue No. 1,534; dated September 8, 1863; Reissue No. 1,932, dated April 11, 1865.

*To all whom it may concern:*

Be it known that I, ISAAC E. PALMER, formerly of the city and county of St. Louis, State of Missouri, late of Montville, county of New London, and State of Connecticut, and now of Middletown, county of Middlesex, and State of Connecticut, have invented a new and useful Improvement in Tackle-Blocks and Pulleys; and I do hereby declare that the following is a full, clear, and exact description of the same, reference being had to the accompanying drawings, forming part of this specification.

This invention consists in so constructing a tackle-block and pulley that the rope or fall, when desired, may be clamped between a portion of the block and a portion of the pulley, and so secured without tying, or the use of dogs, movable stops, or any other means of fastening.

In carrying out my invention the surfaces of the pulley, and of the interior of the cavity provided in the block for its reception, may be made of various forms, but the improvement will be sufficiently explained by a description of those forms represented in the drawings, which I have found successful in practice, and which I consider very well adapted to effect the desired result.

Figure 2:
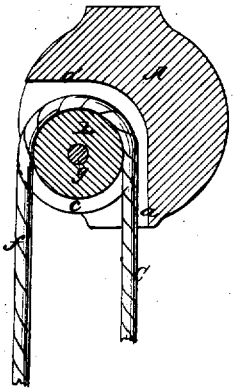
Figure 3:
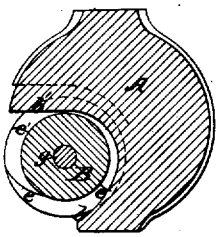
Figure 4:
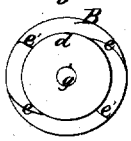
Figure 5:
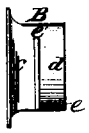

Figure 1 in the drawings is a front view of the block and pulley. Fig. 2 is a vertical section of the same at right angles to Fig. 1, in the plane indicated by the line *x x* in Fig. 1. Fig. 3 is a vertical section at right angles to Fig. 1. Fig. 4 is a right side view of the pulley. Fig. 5 is a front view of the same.

Similar letters of reference indicate corresponding parts in the several figures.

To enable others skilled in the art to make and use my invention, I will proceed to describe its construction and operation.

A is the block, made of any suitable external form, and having provided in it a recess or cavity, *a a′ b b′*, for the reception of the pulley or sheave B. This pulley is made with a surrounding groove, C, like that in an ordinary pulley or sheave, for the reception of the rope C *f*, and at one side of this groove it has a concentric cylindrical projection, *d*, the circumference of which is about equal to that of the bottom of the groove *c*, and one or more portions of the flange or lip between the groove *c* and cylindrical portion *d* is cut away or omitted, as shown at *e e′* in Figs. 1, 3, 4, and 5, to allow a portion of the rope to be slipped out of the groove *c*, when required, as will be presently explained. The pulley is secured in the block by a concentric pin, *g*, upon which it works in the usual manner. The portion *a a′* of the recess *a a′ b b′* receiving the grooved portion of the pulley is large enough in all directions for that part of the pulley and the rope to work freely within it, but the portion *b b′*, of the said recess which receives the cylindrical portion *d* of the pulley is made very little larger than sufficient for the said portion of the pulley, and not large enough to permit the rope to work between it and the cylindrical portion of the pulley.

The operation is as follows: When the fall *f* and other portions of the rope C work in a plane or planes parallel with the planes of revolution of the sheave, the pulley revolves freely in the block in either direction; but if the fall *f* be drawn off obliquely (or moved in a direction lateral) to such planes, as indicated in red outline in Fig. 1, and so caused to slip through one of the openings *e e′* in the flange or lip which is next the cylindrical portion *d*, the instant it is let go it will be drawn by the weight or strain on the tackle between the end *e′* of one of the said openings and the part *b′* of the recess *a a′ b b′*, and so jammed or griped hard enough to secure it without tying, or the use of any other means of fastening. When power is again applied to the fall *f*, it at once liberates itself by the turning of the pulley.

I do not confine myself to the precise form herein described and represented of the pulley or of the cavity provided in the block for its reception; but

What I claim as my invention, and desire to secure by Letters Patent, is—

So constructing a tackle-block and pulley that the rope or fall, when desired, may be clamped between a fixed portion of the block and a portion of the pulley, substantially as herein described, by simply leading it in a direction oblique (lateral) to the plane of revolution of the pulley, without tying, or the use of dogs, or movable stops, or any other means of fastening.

ISAAC E. PALMER.

Witnesses:

HENRY T. BROWN,

J. W. COOMBS.